(12) United States Patent
Nishioka

(10) Patent No.: US 9,685,813 B2
(45) Date of Patent: Jun. 20, 2017

(54) RADIO COMMUNICATION APPARATUS, RADIO COMMUNICATION SYSTEM, AND RADIO COMMUNICATION CONTROL METHOD

(71) Applicant: Panasonic Corporation, Osaka (JP)

(72) Inventor: Shinichiro Nishioka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 259 days.

(21) Appl. No.: 14/083,519

(22) Filed: Nov. 19, 2013

(65) Prior Publication Data

US 2014/0159647 A1 Jun. 12, 2014

(30) Foreign Application Priority Data

Dec. 10, 2012 (JP) ................. 2012-269577

(51) Int. Cl.
 *H02J 7/00* (2006.01)
 *H02J 7/02* (2016.01)
 *H02J 17/00* (2006.01)

(52) U.S. Cl.
 CPC ............ *H02J 7/025* (2013.01); *H02J 7/0004* (2013.01); *H02J 17/00* (2013.01); *H02J 2007/0062* (2013.01)

(58) Field of Classification Search
 CPC .... H02J 7/025; H02J 2007/0062; H02J 17/00; H02J 7/0004; G06F 17/5045; G06F 17/504; G06F 17/5036; G01R 31/318364

(Continued)

(56) References Cited

U.S. PATENT DOCUMENTS 7,936,095 B2 5/2011 Kawabata
8,219,154 B2 7/2012 Wakamatsu
(Continued)

FOREIGN PATENT DOCUMENTS

JP 2007-267110 10/2007
JP 2007-336115 12/2007
(Continued)

*Primary Examiner* — Jack Chiang
*Assistant Examiner* — Brandon Bowers
(74) *Attorney, Agent, or Firm* — Wenderoth, Lind & Ponack, L.L.P.

(57) ABSTRACT

Disclosed is a radio communication apparatus that avoids useless communication to another radio communication apparatus in non-line of sight when the apparatus performs radio communication with the other apparatus while receiving electric supply from the other apparatus. In this apparatus, a radio electric reception section determines whether the electric reception level from the other apparatus is equal to or greater than a first threshold. When the electric reception level is equal to or greater than the first threshold, a radio communication control section controls a radio communication section so that radio communication with the other apparatus starts. After the start of radio communication, the radio electric reception section determines whether the electric reception level is less than a second threshold. When the electric reception level is less than the second threshold, the radio communication control section controls the radio communication section so that the radio communication being performed stops.

11 Claims, 6 Drawing Sheets

(58) Field of Classification Search
USPC .......................................................... 320/107
See application file for complete search history.

(56) References Cited

U.S. PATENT DOCUMENTS

| | | | |
|---|---|---|---|
| 2007/0216348 A1* | 9/2007 | Shionoiri | B60L 8/003 |
| | | | 320/107 |
| 2009/0146503 A1 | 6/2009 | Kawabata | |
| 2009/0254766 A1 | 10/2009 | Yamasuge | |
| 2009/0281678 A1 | 11/2009 | Wakamatsu | |
| 2010/0109843 A1 | 5/2010 | Sugaya | |
| 2011/0156640 A1* | 6/2011 | Moshfeghi | H02J 7/025 |
| | | | 320/108 |
| 2011/0177787 A1* | 7/2011 | Hwang | H02J 7/025 |
| | | | 455/67.11 |

FOREIGN PATENT DOCUMENTS

| | | |
|---|---|---|
| JP | 2009-253762 | 10/2009 |
| JP | 2009-278707 | 11/2009 |
| JP | 2010-114961 | 5/2010 |

* cited by examiner

RADIO COMMUNICATION APPARATUS, RADIO COMMUNICATION SYSTEM, AND RADIO COMMUNICATION CONTROL METHOD

CROSS REFERENCE TO RELATED APPLICATIONS

This application is entitled and claims the benefit of Japanese Patent Application No. 2012-269577, filed on Dec. 10, 2012, the disclosure of which including the specification, drawings and abstract is incorporated herein by reference in its entirety.

TECHNICAL FIELD

The present invention relates to a radio communication apparatus, a radio communication system, and a radio communication control method, for performing electric supply and communication with another radio communication apparatus using radio.

BACKGROUND ART

In recent years, the environment of radio communication has been facing a shortage of a frequency of 6 GHz or less which is broadly used in mobile communications, a wireless LAN (Local Area Network), a wireless PAN (Personal Area Network), for example. As a result, a 60 GHz millimeter wave band enabling the use of a larger bandwidth for the improvement in a transmission speed has been attracting attention. Radio communication standards using the 60 GHz millimeter wave band include, for example, WiGig (Wireless Gigabit).

WiGig defines an extended MAC (Media Access Control) layer and a PAL (Protocol Adaptation Layer) layer on the physical layer of the 60 GHz millimeter wave band. The extended MAC layer is backward compatible with an existing wireless LAN standard (IEEE 802.11). The protocol adaptation layer is a higher order layer than the extended MAC layer, and is used for transmission of the protocol of a wired PAN such as USB (Universal Serial Bus). Using such an extended MAC layer and a protocol adaptation layer enables WiGig to convert wired communication between apparatuses into radio communication.

When WiGig is used to convert a wired connection (for example, USB cable) having both a communication function and an electric supply function into a radio connection, a technique enabling both radio communication and radio electric supply is necessary. Such a technique is disclosed in, for example, Patent Literature 1. A radio communication apparatus in Patent Literature 1 first transmits apparatus information to another radio communication apparatus by radio and then receives radio electric supply from the other radio communication apparatus according to the apparatus information. That is, in order for the radio communication apparatus in Patent Literature 1 to receive electric supply, the radio communication apparatus needs to previously transmit its apparatus information to the other radio communication apparatus, which is the electric supply source.

CITATION LIST

Patent Literature

PTL 1
Japanese Patent Application Laid-Open No. 2009-253762

SUMMARY OF INVENTION

Technical Problem

However, the radio communication apparatus in Patent Literature 1 has a problem when a highly directive radio communication standard such as WiGig is used. That is, when the other radio communication apparatus that is the electric supply source is located in non-line of sight (NLOS) of radio communication, the radio communication apparatus in Patent Literature 1 continues transmission of its apparatus information to the other apparatus and uselessly consumes electric power.

It is an object of the present invention to allow a radio communication apparatus to avoid useless communication with respect to another radio communication apparatus located in non-line of sight when the radio communication apparatus performs radio communication with the other radio communication apparatus while receiving radio electric supply from the other radio communication apparatus.

Solution to Problem

A radio communication apparatus according to an aspect of the present invention includes: a radio communication section that performs radio communication with another radio communication apparatus in line of sight; a radio electric reception section that receive electric supply from the other radio communication apparatus, using radio; and a radio communication control section that controls the radio communication section, in which the radio communication control section controls the radio communication section so that the radio communication with the other radio communication apparatus starts or stops based on an electric reception level of the electric supply from the other radio communication apparatus.

A radio communication system according to an aspect of the present invention is a system in which, when a first radio communication apparatus and a second radio communication apparatus are located in line of sight, the second radio communication apparatus supplies electric power to the first radio communication apparatus using radio, and radio communication is performed between the first radio communication apparatus and the second radio communication apparatus, in which the first radio communication apparatus starts or stops the radio communication with the second radio communication apparatus based on an electric reception level of electric supply from the second radio communication apparatus.

A radio communication control method according to an aspect of the present invention is a method for a radio communication apparatus that receives electric supply using radio from another radio communication apparatus located in line of sight and that performs radio communication with the other radio communication apparatus, the radio communication control method including: starting or stopping the radio communication with the other radio communication apparatus based on an electric reception level of electric supply from the other radio communication apparatus.

Advantageous Effects of Invention

According to the present invention, it is possible for a radio communication apparatus to avoid useless communication with respect to another radio communication apparatus located in non-line of sight when the radio communication apparatus performs radio communication with the other radio communication apparatus while receiving radio electric supply from the other radio communication apparatus.

DESCRIPTION OF EMBODIMENTS

Embodiment 1

Embodiment 1 according to the present invention will be explained with reference to the accompanying drawings.

<Configuration of Radio Communication System>

Figure 1A:
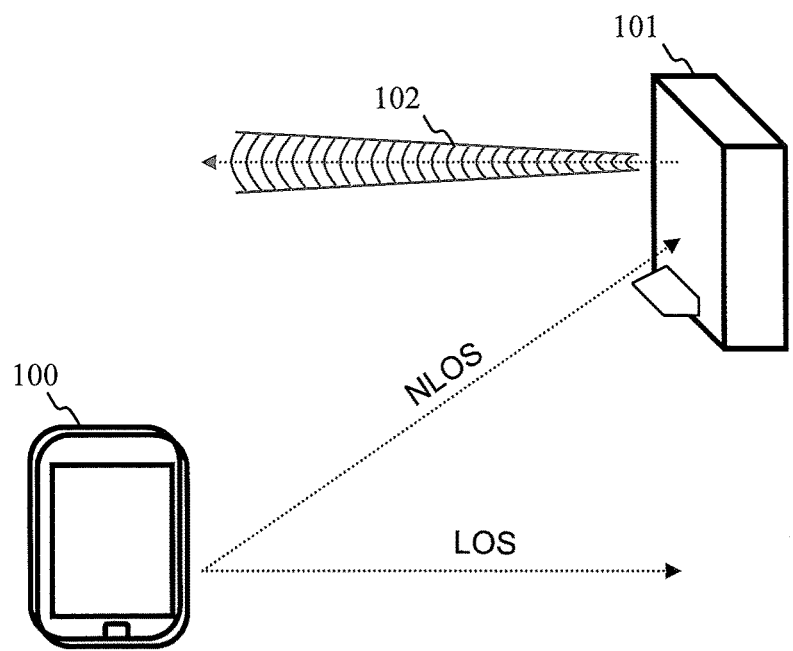
FIGS. 1A and 1B each illustrate an example of a positional relationship between two radio communication apparatuses included in a radio communication system according to Embodiment 1.
Figure 1B:
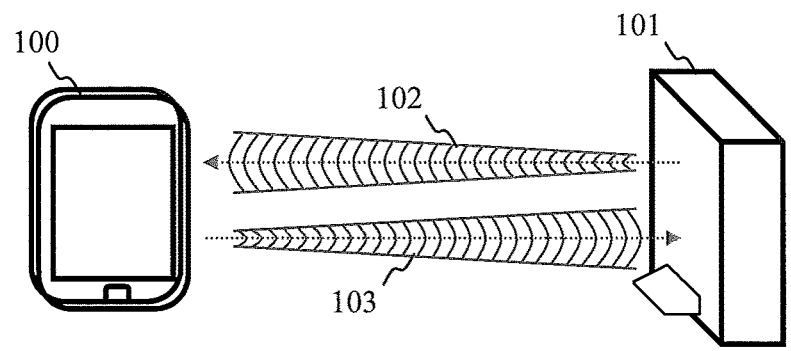

First, configuration examples of a radio communication system according to Embodiment 1 of the present invention will be explained with reference to FIGS. 1A and 1B. FIGS. 1A and 1B each illustrate an example of a positional relationship between two radio communication apparatuses included in the radio communication system according to the present embodiment.

In FIGS. 1A and 1B, the radio communication system according to the present embodiment includes radio communication apparatus 100 and radio communication apparatus 101. Radio communication apparatus 100 performs highly directive radio communication (for example, communication using WiGig) with radio communication apparatus 101. When being located in the line of sight (LOS) of radio communication, radio communication apparatus 100 receives radio electric supply having the line of sight in the same direction as that of the radio communication, from radio communication apparatus 101.

In FIG. 1A, radio communication apparatus 100 is located where radio communication apparatus 100 cannot receive radio electric supply 102 from radio communication apparatus 101. At this time, radio communication apparatus 100 judges that radio communication apparatus 100 is located outside the line of sight of the radio communication and stops the radio communication. The details of this operation will be described, hereinafter.

On the other hand, in FIG. 1B, radio communication apparatus 100 is located where radio communication apparatus 100 can receive radio electric supply 102 from radio communication apparatus 101. At this time, radio communication apparatus 100 judges that radio communication apparatus 100 is located in the line of sight of the radio communication and performs radio communication 103. The details of this operation will be described, hereinafter.

Here ends the explanation of the configuration examples of the radio communication system according to the present embodiment.

<Configuration of Radio Communication Apparatus 100>

Figure 2:
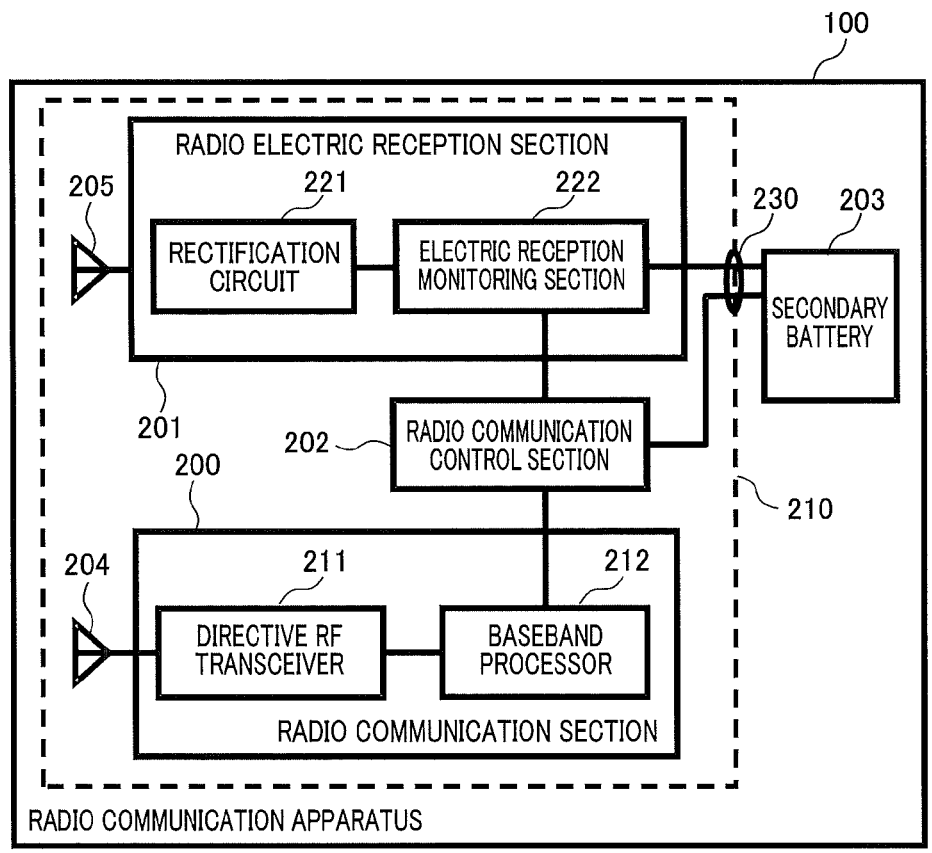
FIG. 2 is a block diagram illustrating a configuration example of the radio communication apparatus according to Embodiment 1.

Next, a configuration example of radio communication apparatus 100 according to the present embodiment will be explained with reference to FIG. 2. FIG. 2 is a block diagram illustrating the configuration example of radio communication apparatus 100 according to the present embodiment.

In FIG. 2, radio communication apparatus 100 includes radio communication section 200, radio electric reception section 201, radio communication control section 202, and secondary battery 203.

Radio communication section 200 includes directive RF (Radio Frequency) transceiver 211 that transmits and receives an electric wave via directive communication antenna 204, and baseband processor 212 that performs processes on radio communication. This configuration enables radio communication section 200 to perform high-speed and highly directive radio communication using WiGig, for example.

Radio electric reception section 201 includes rectification circuit 221 and electric reception monitoring section 222.

Rectification circuit 221 converts, into a DC current, electric power received as radio electric supply 102 via electric reception antenna 205, and outputs the converted power to electric reception monitoring section 222. Electric reception antenna 205 has a directivity in the same direction as directive communication antenna 204.

Electric reception monitoring section 222 monitors the output value (hereinafter referred to as "electric reception level") of the DC current from rectification circuit 221. Electric reception monitoring section 222 determines whether the electric reception level is equal to or greater than a first threshold. When the result of this determination indicates that the electric reception level is equal to or greater than the first threshold, electric reception monitoring section 222 notifies radio communication control section 202 of the result. The first threshold will be described hereinafter. Electric reception monitoring section 222 also determines whether the electric reception level is less than a second threshold. When the result of this determination indicates that the electric reception level is less than the second threshold, electric reception monitoring section 222 notifies radio communication control section 202 of the result. The second threshold will be described, hereinafter.

Electric reception monitoring section 222 may judge electric reception start/electric reception completion by determining the reception level and may control supply of the DC current to secondary battery 203 on the basis of the result of judgment.

Moreover, electric reception monitoring section 222 supplies the DC current from rectification circuit 221 to secondary battery 203 through secondary battery interface 230, regardless of the result of determination described above, i.e., the magnitude of the electric reception level. This can charge secondary battery 203.

It is preferable that radio electric reception section 201 perform a radio electric reception scheme such as a magnetic field resonance scheme enabling highly efficient transmission for a relatively long distance of several meters.

Radio communication control section 202 controls radio communication section 200 on the basis of the result of determination on the electric reception level notified by electric reception monitoring section 222 and performs or stops the radio communication. Radio communication control section 202 is implemented using, for example, a CPU (Central Processing Unit) using a stored program system.

Secondary battery 203 converts the DC current from radio electric reception section 201 into chemical energy and stores therein the energy. The electric power stored in secondary battery 203 is used as drive electric power for radio communication apparatus 100 as appropriate.

Radio communication apparatus 100 is not limited to the configuration illustrated in FIG. 2. Radio communication apparatus 100 at least includes radio communication section 200, radio electric reception section 201, and radio communication control section 202. FIG. 2 illustrates a minimum configuration of radio communication apparatus 210, which is implemented by, for example, one or more chips as an integrated circuit. Radio communication apparatus 210 is connected to a host apparatus (not illustrated) including secondary battery 203. Here, radio communication apparatus 210 may be connected to the host apparatus through a USB interface. In this case, radio communication apparatus 210 supplies the electric power received in radio electric reception section 201, to secondary battery 203 of the host apparatus through the USB interface. Moreover, radio communication apparatus 210 can also acquire the remaining amount of secondary battery 203 similarly through the USB interface. Alternatively, all or some of the processes performed by radio communication control section 202 may be performed by general purpose processor included in the host apparatus.

Here ends the explanation of the configuration example of radio communication apparatus 100 according to the present embodiment.

<Operations of Radio Communication Apparatus 100>

Figure 3:
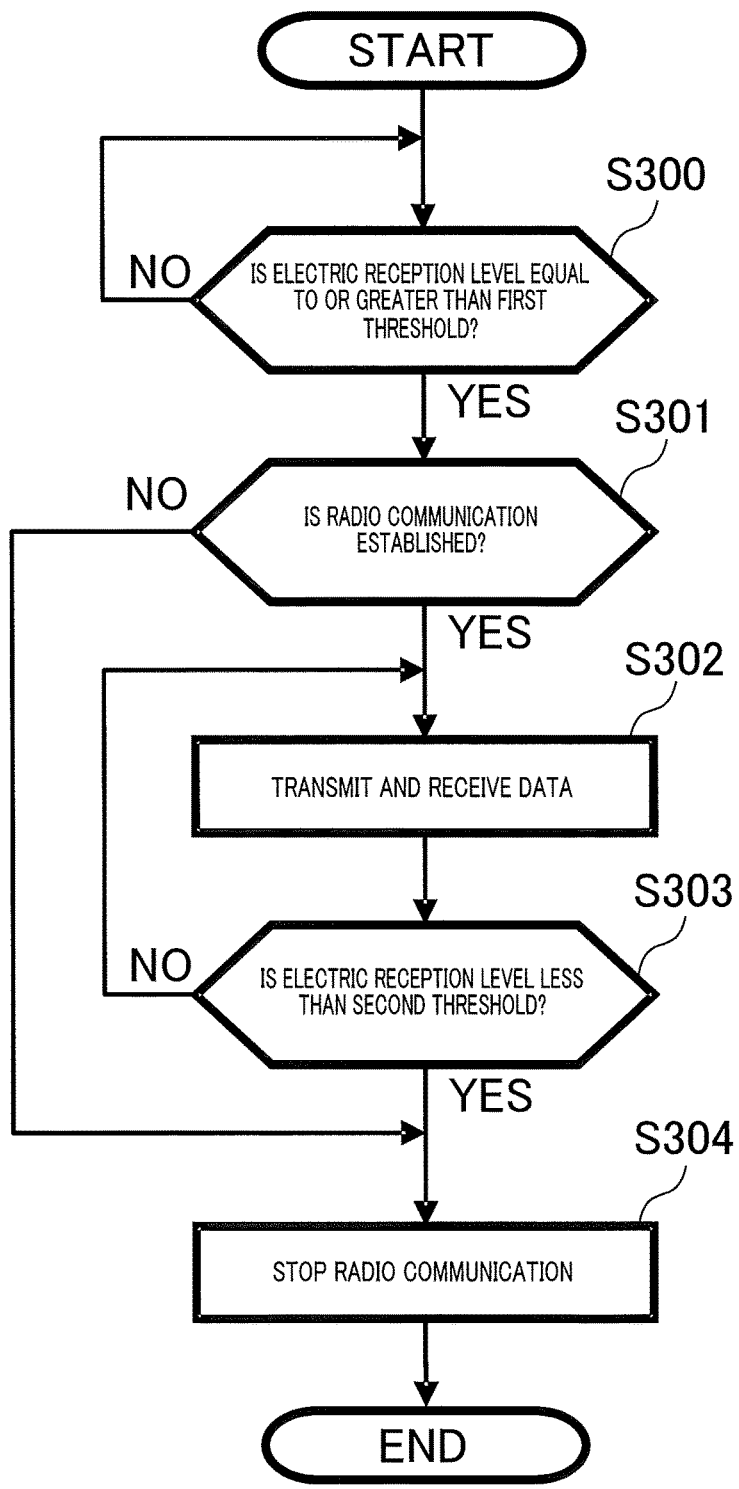
FIG. 3 is a flowchart illustrating an operation example of the radio communication apparatus according to Embodiment 1.

Next, operation examples of radio communication apparatus 100 according to the present embodiment will be explained with reference to FIG. 3. FIG. 3 is a flowchart illustrating the operation examples of radio communication apparatus 100 according to the present embodiment.

In Step S300, radio communication section 200 is in a stop state. In this state, electric reception monitoring section 222 of radio electric reception section 201 determines whether the electric reception level is equal to or greater than the predetermined first threshold. The first threshold is an electric reception level when radio communication apparatus 101 enters from non-line of sight of the radio communication (for example, the state in FIG. 1A) into the line of sight (for example, the state in FIG. 1B).

When the result of determination in Step S300 indicates that the electric reception level is not equal to or greater than the first threshold (Step S300: NO), electric reception monitoring section 222 continuously monitors the electric reception level. That is, the flow returns to Step S300.

When the result of determination in Step S300 indicates that the electric reception level is equal to or greater than the first threshold (Step S300: YES), electric reception monitoring section 222 notifies radio communication control section 202 that the electric reception level is equal to or greater than the first threshold. Then, the flow progresses to Step S301.

In Step S301, when notified that the electric reception level is equal to or greater than the first threshold from electric reception monitoring section 222, radio communication control section 202 starts radio communication section 200. Then, radio communication control section 202 exchanges a MAC layer management frame with radio communication apparatus 101, and controls radio communication section 200 so that an attempt to establish radio communication with radio communication apparatus 101 is made. The management frame is a MAC frame, such as beacon, probe request/response, and association request/response in IEEE 802.11 wireless LAN standard. Then, radio communication control section 202 determines whether the radio communication is established with radio communication apparatus 101.

When the result of determination in Step S301 indicates that the radio communication is not established (Step S301: NO), the flow progresses to Step S304. Examples of failure in establishment of the radio communication include a case where radio communication apparatus 101 is used only for electric supply and does not have a function to transmit and receive a management frame.

When the result of determination in Step S301 indicates that the radio communication is established (Step S301: YES), the flow progresses to Step S302.

In Step S302, radio communication control section 202 controls radio communication section 200 so that data is transmitted to and received from radio communication apparatus 101. The data transmitted and received at this time is, for example, data processed in an application. Then, at a predetermined timing while the data is transmitted and received, electric reception monitoring section 222 processes Step S303 described, hereinafter.

In radio communication apparatus 100 according to the present embodiment, a higher electric reception level of radio electric supply 102 from radio communication apparatus 101 improves the electric wave condition of radio communication. Consequently, during transmission and reception of data, radio communication control section 202 may receive a notification of electric reception level from the electric reception monitoring section 222 as appropriate and may switch the modulation scheme and the coding rate for the radio communication based on the electric reception level. For example, many combinations of setting values for modulation schemes and coding rates in IEEE 802.11 wireless LAN standard are defined as the MCSs (Modulation and Coding Schemes). Therefore, radio communication control section 202 may just select a combination including a higher speed MCS on the basis of the definition of the MCS and an increase in the electric reception level.

In Step S303, electric reception monitoring section 222 determines whether the electric reception level is less than the predetermined second threshold. The second threshold is an electric reception level when radio communication apparatus 101 leaves the line of sight (for example, the state in FIG. 1B) of the radio communication and enters non-line of sight (for example, the state in FIG. 1A), and has a value equal to or less than the first threshold.

When the result of the determination in Step S303 indicates that the electric reception level is not less than the second threshold (Step S303: NO), radio communication section 200 continuously transmits and receives the data. That is, the flow returns to Step S302.

When the result of the determination in Step S303 indicates that the electric reception level is less than the second threshold (Step S303: YES), electric reception monitoring section 222 notifies radio communication control section 202 that the electric reception level is less than the second threshold. Then, the flow progresses to Step S304.

In Step S304, radio communication control section 202 controls radio communication section 200 so that the radio communication with radio communication apparatuses 101 stops. Then, radio communication control section 202 stops radio communication section 200.

Here ends the explanation of the example operations of radio communication apparatus 100 according to the present embodiment.

<Operations of Radio Communication System>

Figure 4:
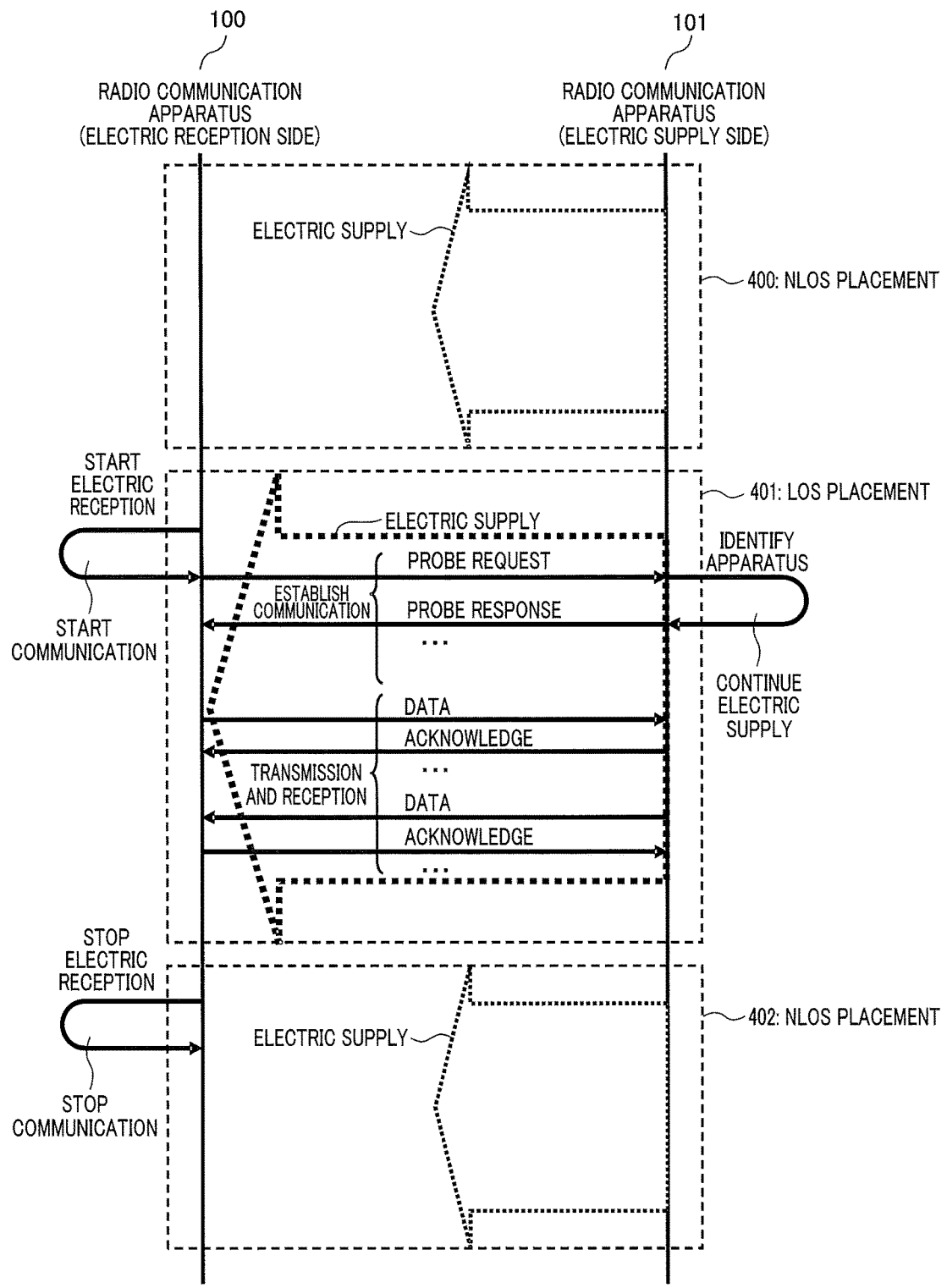
FIG. 4 is a sequence diagram illustrating an operation example of the radio communication system according to Embodiment 1.

Next, operation examples of the radio communication system according to the present embodiment will be explained with reference to FIG. 4. FIG. 4 illustrates the sequence of operations of the radio communication system according to the present embodiment. Radio communication apparatus 101 operates as an electric supply side, and radio communication apparatus 100 operates as an electric reception side.

First, the case of NLOS placement 400 will be explained. In this case, radio communication apparatus 100 and radio communication apparatus 101 are placed, for example, in non-line of sight (NLOS), as illustrated in FIG. 1A. At this time, radio communication apparatus 100 and radio communication apparatus 101 perform neither radio communication nor radio electric supply. That is, radio communication apparatus 100 waits for the start of radio electric reception from radio communication apparatus 101. On the other hand, radio communication apparatus 101 waits for reception of a request for establishing communication from radio communication apparatus 100.

Next, the case of LOS placement 401 will be explained. For example, radio communication apparatus 100 illustrated in FIG. 1A moves into the line of sight and is thus located in LOS placement 401. In this case, radio communication apparatus 100 and radio communication apparatus 101 are placed, for example, in the line of sight (LOS), as illustrated in FIG. 1B. At this time, radio communication apparatus 100 determines whether the electric reception level of radio electric supply 102 from radio communication apparatus 101 is equal to or greater than the first threshold. Then, when determining that the electric reception level is equal to or greater than the first threshold, radio communication apparatus 100 starts radio communication section 200 and transmits a management frame for establishing communication to radio communication apparatus 101. For example, the management frame is a probe request and includes the MAC address of radio communication apparatus 100.

Upon reception of a management frame from radio communication apparatus 100, radio communication apparatus 101 authenticates radio communication apparatus 100 on the basis of the MAC address included in the management frame. That is, radio communication apparatus 101 judges whether radio communication apparatus 100 is an apparatus having permission for electric supply. Here, when judging that radio communication apparatus 100 is not an apparatus having permission for electric supply, radio communication apparatus 101 stops radio electric supply 102. On the other hand, when judging that radio communication apparatus 100 is an apparatus having permission for electric supply, radio communication apparatus 101 continues radio electric supply 102 and also transmits, for example, a probe response to radio communication apparatus 100. Upon reception of the probe response, radio communication apparatus 100 judges that the radio communication has been established. Then, radio communication apparatus 100 transmits and receives the data to and from radio communication apparatuses 101.

Next, the case of NLOS placement 402 will be explained. For example, radio communication apparatus 100 illustrated in FIG. 1B moves into non-line of sight and is thus located in NLOS placement 402. In this case, radio communication apparatus 100 and radio communication apparatus 101 are placed, for example, in non-line of sight (NLOS), as illustrated in FIG. 1A. At this time, radio communication apparatus 100 determines whether the electric reception level of radio electric supply from radio communication apparatus 101 is less than the second threshold. Then, when determining that the electric reception level is less than the second threshold, radio communication apparatus 100 stops transmission and reception of data and stops radio communication section 200.

Here ends the explanation of the operation examples of the radio communication system according to the present embodiment.

As explained above, after the electric reception level from radio communication apparatus 101 becomes equal to or greater than the first threshold, radio communication apparatus 100 according to the present embodiment starts radio communication section 200 and transmits a request for establishing communication to radio communication apparatus 101. That is, when radio communication apparatus 101 is located in non-line of sight, radio communication apparatus 100 does not transmit a request for establishing communication to radio communication apparatus 101. As a result, radio communication apparatus 100 can avoid useless communication with radio communication apparatus 101 in non-line of sight, which in turn makes it possible to avoid electric power consumption for useless communication.

A radio communication apparatus according to a related art continues transmission of apparatus information to another radio communication apparatus being an electric supply source located in non-line of sight of radio communication and consumes useless electric power. In contrast to this, radio communication apparatus 100 according to the present embodiment stops transmission of apparatus information regardless of whether the other radio communication apparatus is located in the line of sight. Then, when determining that the electric reception level from the other radio communication apparatus is equal to or greater than the first threshold, radio communication apparatus 100 starts transmission of apparatus information. Therefore, radio communication apparatus 100 can prevent transmission of apparatus information to the other radio communication apparatus in non-line of sight and can prevent useless electric power consumption for the transmission.

Moreover, when the authentication of radio communication apparatus 100 succeeds, radio communication apparatus 101 according to the present embodiment continues radio electric supply 102. On the other hand, when the authentication fails, radio communication apparatus 101 stops radio electric supply 102. Therefore, radio communication apparatus 101 does not have to provide electric supply to a radio communication apparatus having no right for receiving electric supply.

Embodiment 2

Embodiment 2 according to the present invention will be explained with reference to the accompanying drawings.

<Configuration of Radio Communication Apparatus 100>

First, a configuration example of radio communication apparatus 100 according to the present embodiment will be explained. The configuration of radio communication apparatus 100 according to Embodiment 2 basically has the same configuration as the configuration illustrated in FIG. 2. Therefore, only different points will be explained.

Directive communication antenna 204 includes a plurality of antennas having different directivities and supports transmit beamforming. Transmit beamforming is a technique for controlling the directivity of radio communication by setting suitable weighting (beamforming pattern) for a plurality of antennas having different directivities. In order to determine the beamforming pattern, radio communication apparatus 100 that is a transmission side transmits the plurality of training packets respectively having different beamforming patterns to radio communication apparatus 101. Then, radio communication apparatus 101 that is a reception side selects a training packet having the highest reception quality from among the plurality of received training packets and notifies radio communication apparatus 100 of the selected training packet. Here, the training packet having the highest reception quality is a training packet having the highest signal-to-noise ratio (SNR), for example. Upon reception of the notification of a high training packet having the highest reception quality from radio communication apparatus 101, radio communication apparatus 100 selects an antenna for which the beamforming pattern of the training packet is set. Radio communication apparatus 100 performs packet transmission through the selected antenna. Radio communication apparatus 100 and radio communication apparatus 101 can thereby perform stable radio communication. Then, radio communication apparatus 100 periodically performs transmit beamforming and thus can follow a change in the position relative to radio communication apparatus 101.

Radio communication control section 202 acquires the residual quantity of secondary battery 203 through secondary battery interface 230, controls radio communication section 200 on the basis of the residual quantity, and performs or stop the radio communication.

Secondary battery 203 includes, for example, a battery IC (Integrated Circuit) and notifies radio communication control section 202 of the residual quantity of secondary battery 203 through secondary battery interface 230.

Here ends the explanation of the configuration example of radio communication apparatus 100 according to the present embodiment.

<Operations of Radio Communication Apparatus 100>

Figure 5:
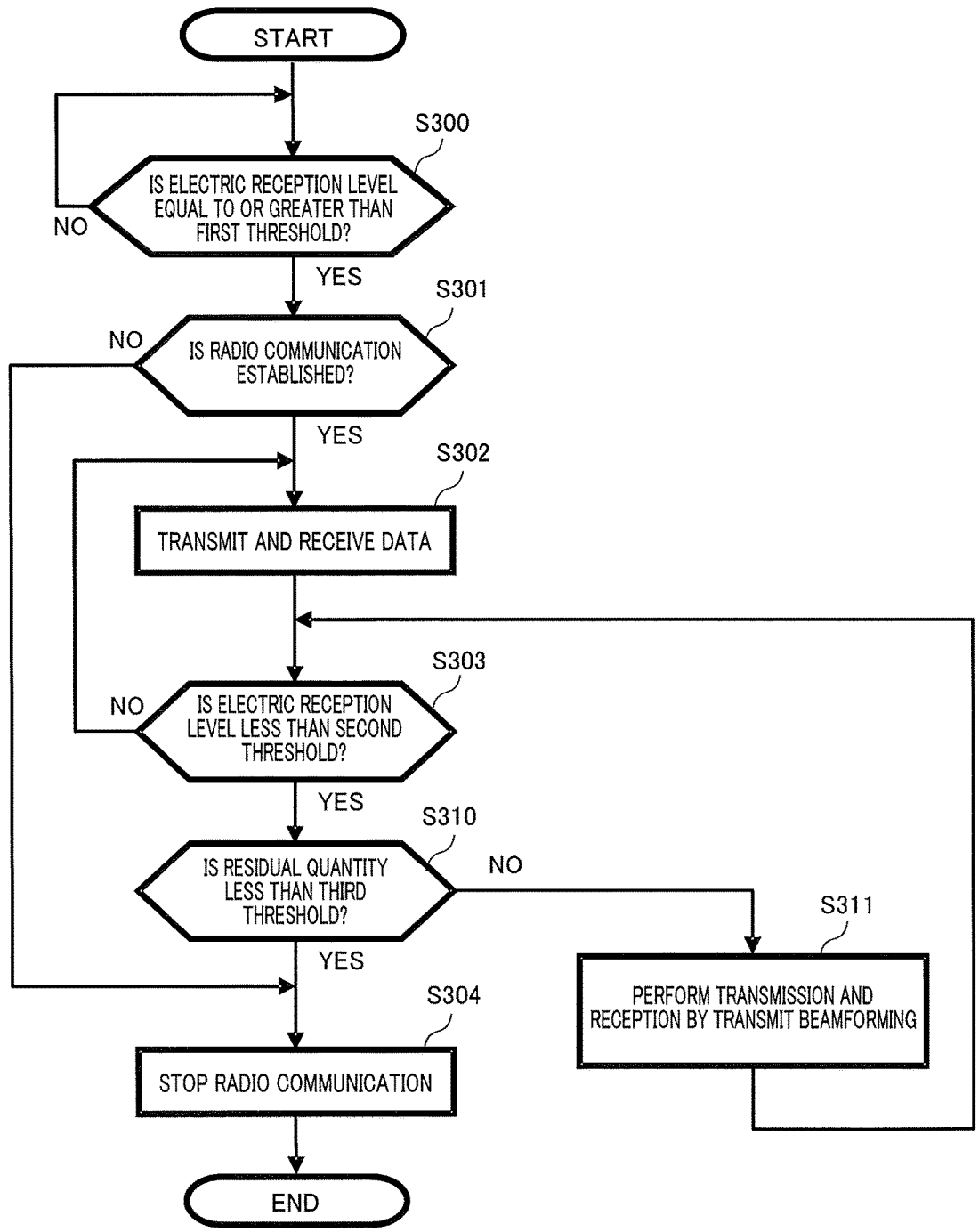
FIG. 5 is a flowchart illustrating an operation example of a radio communication apparatus according to Embodiment 2.

Next, operation examples of radio communication apparatus 100 according to the present embodiment will be explained with reference to FIG. 5. FIG. 5 is a flowchart illustrating the operation examples of radio communication apparatus 100 according to the present embodiment.

FIG. 5 illustrates a flow that is different from that in FIG. 3 in that Steps S310 and S311 are added to the flow in FIG. 3. The steps other than these steps are the same as those in FIG. 3, and therefore the explanation thereof is omitted here. Thus, only Steps S310 and S311 will be explained below.

In Step S310, radio communication control section 202 acquires the residual quantity of secondary battery 203 through secondary battery interface 230 and determines whether the residual quantity (hereinafter referred to as "battery residual quantity") is less than a third threshold. The third threshold is a value indicating, for example, the battery residual quantity that enables transmit beamforming.

When the result of determination in Step S310 indicates that the battery residual quantity is less than the third threshold (Step S310: YES), radio communication control section 202 processes Step S304.

When the result of the determination in Step S310 indicates that the battery residual quantity is not less than the third threshold (Step S310: NO), radio communication control section 202 processes Step S311 in order to continue the radio communication.

In Step S311, radio communication control section 202 instructs radio communication section 200 to enable transmit beamforming and to transmit a training packet (an example of a beamforming request) to radio communication apparatus 101. Then, radio communication control section 202 continues transmission and reception of the data (based on a directivity control) following a change in the relative position, on the basis of a beamforming response from radio communication apparatus 101. When supporting omnidirectional radio communication (2.4 GHz or 5 GHz band IEEE 802.11 wireless LAN standard), radio communication section 200 may switch from directive radio communication to omnidirectional radio communication and continue transmission and reception of the data. The omnidirectional radio communication operates in a different frequency band from that of the directive radio communication. The flow returns to Step S303 after Step S311.

Here ends the explanation of the operation examples of radio communication apparatus 100 according to the present embodiment.

<Operations of Radio Communication System>

Figure 6:
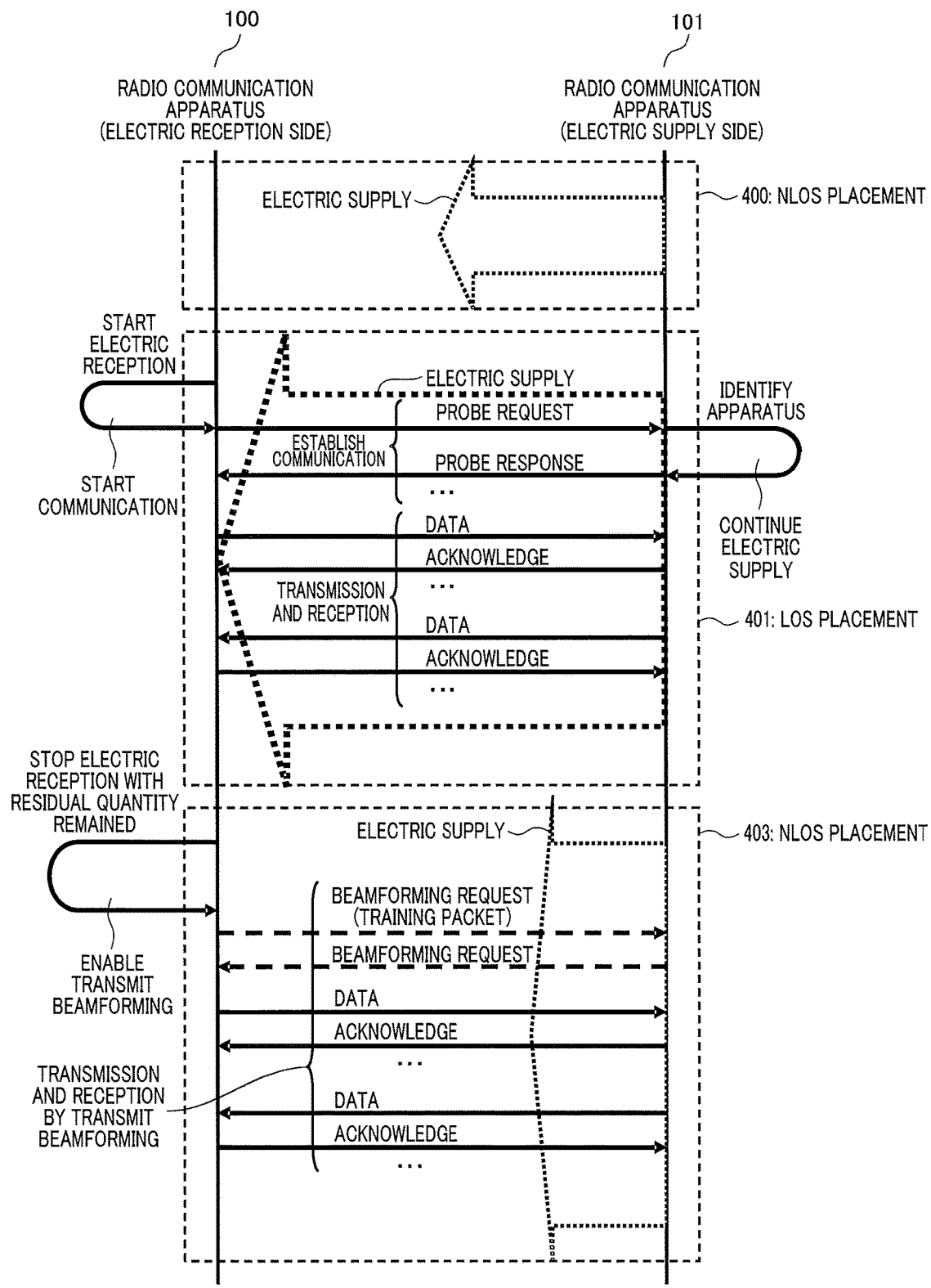
FIG. 6 is a sequence diagram illustrating an operation example of the radio communication system according to Embodiment 2.

Next, operation examples of the radio communication system according to the present embodiment will be explained with reference to FIG. 6. FIG. 6 illustrates the sequence of operations of the radio communication system according to the present embodiment. Radio communication apparatus 101 operates as an electric supply side, and radio communication apparatus 100 operates as an electric reception side.

FIG. 6 illustrates a sequence different from that in FIG. 4 in that NLOS placement 403 is added instead of NLOS placement 402 to the sequence in FIG. 4. NLOS placement 400 and LOS placement 401 are the same as those in FIG. 4, and therefore the explanation thereof is omitted here.

Next, the case of NLOS placement 403 will be explained. For example, radio communication apparatus 100 illustrated in FIG. 1B moves into non-line of sight and is thus located in NLOS placement 403. In this case, radio communication apparatus 100 and radio communication apparatus 101 are placed, for example, in non-line of sight (NLOS), as illustrated in FIG. 1A. At this time, radio communication apparatus 100 determines that the level of radio electric supply from radio communication apparatus 101 is less than the second threshold, and detects the stop of the electric reception. Then, radio communication apparatus 100 judges that the residual quantity of secondary battery 203 is not less than the third threshold, and transmits a beamforming request (for example, a training packet) to radio communication apparatus 101. Radio communication apparatus 101 transmits a beamforming response to radio communication apparatus 100 in response to the received beamforming request. Radio communication apparatus 100 continues transmission and reception of the data using transmit beamforming.

Here ends the explanation of the operation examples of the radio communication system according to the present embodiment.

As explained above, when the residual quantity of secondary battery 203 exceeds a predetermined value after the stop of the electric reception is detected, radio communication apparatus 100 according to the present embodiment continues the radio communication using transmit beamforming. Accordingly, even if the electric reception stops, radio communication apparatus 100 can continue the radio communication if the battery residual quantity is sufficient.

Moreover, similarly to Embodiment 1, when the authentication of radio communication apparatus 100 succeeds, radio communication apparatus 101 according to the present embodiment continues radio electric supply 102. On the other hand, when the authentication fails, radio communication apparatus 101 stops radio electric supply 102. Therefore, radio communication apparatus 101 does not have to provide electric supply to a radio communication apparatus having no right for receiving electric supply.

<Variations of Embodiments>

Embodiments 1 and 2 have been explained above. However, the above-mentioned explanations are just examples, and various modifications can be applied to the embodiments. Hereinafter, variations will be explained.

In Embodiments 1 and 2, radio communication apparatus 101 that is an electric supply source may control the transmission electric power of radio electric supply 102 so that the transmission power varies before authentication of radio communication apparatus 100 and after the authentication succeeds. For example, radio communication apparatus 101 keeps the transmission electric power at a predetermined value before authenticating radio communication apparatus 100 and supplies normal transmission electric power (a larger value than the restricted value) after the authentication of radio communication apparatus 100 succeeds. Thereby, radio communication apparatus 101 can reduce useless radio electric supply in the case of no receiver. When the authentication of radio communication apparatus 100 fails, radio communication apparatus 101 may continue the radio electric supply 102 with the restricted value, or may stop radio electric supply 102.

In determination of Step S303 of FIG. 5 in Embodiment 2, radio communication control section 202 may determine the electric reception level using a fourth threshold instead of the second threshold. The fourth threshold is a larger value than the second threshold and a value for indicating deterioration of communication environment. Radio communication apparatus 100 can thereby shift radio communication to one that uses transmit beamforming, before the electric reception level decreases to a level that stops the electric reception.

In Embodiments 1 and 2 and variations thereof, the present invention is configured with hardware by way of example, but the invention may also be realized by software in cooperation with hardware.

A radio communication apparatus according to this disclosure includes: a radio communication section that performs radio communication with another radio communication apparatus in line of sight; a radio electric reception section that receive electric supply from the other radio communication apparatus, using radio; and a radio communication control section that controls the radio communication section, in which the radio communication control section controls the radio communication section so that the radio communication with the other radio communication apparatus starts or stops based on an electric reception level of the electric supply from the other radio communication apparatus.

In the radio communication apparatus according to this disclosure, the radio communication control section switches a modulation scheme and a coding rate for the radio communication based on the electric reception level.

In the radio communication apparatus according to this disclosure: when the electric reception level is equal to or greater than a first threshold, the radio communication control section controls the radio communication section so that the radio communication with the other radio communication apparatus starts; and when the electric reception level is less than a second threshold smaller than the first threshold, the radio communication control section controls the radio communication section so that the radio communication with the other radio communication apparatus stops.

The radio communication apparatus according to this disclosure further includes a secondary battery that charges electric power received by the radio electric reception section, in which: when the electric reception level is determined to be less than the second threshold, the radio communication control section determines whether a residual quantity of the secondary battery is less than a third threshold; and when the residual quantity of the secondary battery is less than the third threshold, the radio communication control section controls the radio communication section so that the radio communication with the radio communication apparatus stops, and when the residual quantity of the secondary battery is not less than the third threshold, the radio communication control section controls the radio communication section so that the radio communication with the radio communication apparatus continues.

In the radio communication apparatus according to this disclosure: the radio communication section is connected to a plurality of antennas that have different directivities; and the radio communication control section inquires reception quality to the other radio communication apparatus when the residual quantity of the secondary battery is not less than the third threshold, the radio communication control section selects a predetermined antenna from among the plurality of antennas based on the reception quality notified by the other radio communication apparatus, and the radio communication control section continues the radio communication with the other radio communication apparatus, using the selected antenna.

In the radio communication apparatus according to this disclosure when the radio communication with the other radio communication apparatus is continued, the radio communication section switches to omnidirectional radio communication that operates in a frequency band different from that of the radio communication.

In the radio communication apparatus according to this disclosure: the radio communication apparatus is connected to an external host apparatus through a wired interface, and the radio communication apparatus charges a secondary battery of the host apparatus with electric power received by the radio electric reception section through the wired interface; and the radio communication control section acquires a residual quantity of the secondary battery of the host apparatus through the wired interface.

In the radio communication apparatus according to this disclosure, the wired interface is a USB interface.

A radio communication system according to this disclosure is a system in which, when a first radio communication apparatus and a second radio communication apparatus are located in line of sight, the second radio communication apparatus supplies electric power to the first radio communication apparatus using radio, and radio communication is performed between the first radio communication apparatus and the second radio communication apparatus, in which the first radio communication apparatus starts or stops the radio communication with the second radio communication apparatus based on an electric reception level of electric supply from the second radio communication apparatus.

A radio communication control method according to this disclosure is a method for a radio communication apparatus that receives electric supply using radio from another radio communication apparatus located in line of sight and that performs radio communication with the other radio communication apparatus, the radio communication control method including: starting or stopping the radio communication with the other radio communication apparatus based on an electric reception level of electric supply from the other radio communication apparatus.

A radio communication control program according to this disclosure is a program causing a computer of a radio communication apparatus that receives electric supply using radio from another radio communication apparatus located in line of sight and that performs radio communication with the other radio communication apparatus, the radio communication control program causing the computer to execute a process including: starting or stopping the radio communication with the other radio communication apparatus based on an electric reception level of electric supply from the other radio communication apparatus.

INDUSTRIAL APPLICABILITY

The present invention is suitable for use in, for example, a radio communication apparatus, a system, and a program for performing electric supply and communication with another radio communication apparatus using radio. The present invention is applicable to an apparatus driven by a secondary battery, such as a smart phone, a tablet, a game machine, a digital still camera, or a notebook PC.

REFERENCE SIGNS LIST

100 Radio communication apparatus
101 Radio communication apparatus
200 Radio communication section
201 Radio electric reception section
202 Radio communication control section
203 Secondary battery

The invention claimed is:

1. A radio communication apparatus that performs radio communication with another radio communication apparatus while receiving radio electric supply from the other radio communication apparatus, the radio communication apparatus comprising:
   a radio communication section that performs the radio communication with the other radio communication apparatus in line of sight;
   a radio electric reception section that receives the electric supply from the other radio communication apparatus, using radio;
   a radio communication control section that controls the radio communication section; and
   a secondary battery that charges electric power received by the radio electric reception section, wherein
   when the radio communication section is in a stop state in which the radio communication is not taking place with the other radio communication apparatus, the radio communication control section controls the radio communication section to start the radio communication with the other radio communication apparatus or to maintain the radio communication section in the stop state based on an electric reception level of the electric supply from the other radio communication apparatus,
   when the electric reception level is equal to or greater than a first threshold, the radio communication control section controls the radio communication section so that the radio communication with the other radio communication apparatus starts,
   when the electric reception level is less than a second threshold smaller than the first threshold, the radio communication control section determines whether a residual quantity of the secondary battery is less than a third threshold, and
   when the residual quantity of the secondary battery is less than the third threshold, the radio communication control section controls the radio communication section so that the radio communication with the other radio communication apparatus stops, and when the residual quantity of the secondary battery is not less than the third threshold, the radio communication control section controls the radio communication section so that the radio communication with the other radio communication apparatus continues.

2. The radio communication apparatus according to claim 1, wherein the radio communication control section switches a modulation scheme and a coding rate for the radio communication based on the electric reception level.

3. The radio communication apparatus according to claim 1, wherein:
   the radio communication section is connected to a plurality of antennas that have different directivities; and
   the radio communication control section inquires reception quality to the other radio communication apparatus when the residual quantity of the secondary battery is not less than the third threshold,
   the radio communication control section selects a predetermined antenna from among the plurality of antennas based on the reception quality notified by the other radio communication apparatus, and
   the radio communication control section continues the radio communication with the other radio communication apparatus, using the selected antenna.

4. The radio communication apparatus according to claim 1, wherein, when the radio communication with the other radio communication apparatus is continued, the radio communication section switches to omnidirectional radio communication that operates in a frequency band different from that of the radio communication.

5. The radio communication apparatus according to claim 3, wherein, when the radio communication with the other radio communication apparatus is continued, the radio communication section switches to omnidirectional radio communication that operates in a frequency band different from that of the radio communication.

6. The radio communication apparatus according to claim 1, wherein:
   the radio communication apparatus is connected to an external host apparatus through a wired interface, and
   the radio communication apparatus charges a secondary battery of the host apparatus with electric power received by the radio electric reception section through the wired interface; and
   the radio communication control section acquires a residual quantity of the secondary battery of the host apparatus through the wired interface.

7. The radio communication apparatus according to claim 3, wherein:
   the radio communication apparatus is connected to an external host apparatus through a wired interface, and
   the radio communication apparatus charges a secondary battery of the host apparatus with electric power received by the radio electric reception section through the wired interface; and
   the radio communication control section acquires a residual quantity of the secondary battery of the host apparatus through the wired interface.

8. The radio communication apparatus according to claim 4, wherein:
   the radio communication apparatus is connected to an external host apparatus through a wired interface, and the radio communication apparatus charges a secondary battery of the host apparatus with electric power received by the radio electric reception section through the wired interface; and the radio communication control section acquires a residual quantity of the secondary battery of the host apparatus through the wired interface.

9. The radio communication apparatus according to claim 6, wherein the wired interface is a USB interface.

10. A radio communication system in which, when a first radio communication apparatus and a second radio communication apparatus are located in line of sight, the second radio communication apparatus supplies electric power to the first radio communication apparatus using radio, and radio communication is performed between the first radio communication apparatus and the second radio communication apparatus, wherein when the first radio communication apparatus is in a stop state in which the radio communication is not taking place with the second radio communication apparatus, the first radio communication apparatus starts the radio communication with the second radio communication apparatus or maintains the stop state based on an electric reception level of electric supply from the second radio communication apparatus, when the electric reception level is equal to or greater than a first threshold, the first radio communication apparatus starts the radio communication with the second radio communication apparatus, when the electric reception level is less than a second threshold smaller than the first threshold, the first radio communication apparatus determines whether a residual quantity of a secondary battery of the first radio communication apparatus is less than a third threshold, and when the residual quantity of the secondary battery is less than the third threshold, the first radio communication apparatus stops the radio communication with the second radio communication apparatus, and when the residual quantity of the secondary battery is not less than the third threshold, the first radio communication apparatus continues the radio communication with the second radio communication apparatus.

11. A radio communication control method for a radio communication apparatus that receives electric supply using radio from another radio communication apparatus located in line of sight and that performs radio communication with the other radio communication apparatus, the radio communication control method comprising:

controlling, when the radio communication apparatus is in a stop state in which the radio communication is not taking place with the other radio communication apparatus, the radio communication apparatus to start the radio communication with the other radio communication apparatus or to maintain the radio communication apparatus in the stop state based on an electric reception level of electric supply from the other radio communication apparatus, wherein when the electric reception level is equal to or greater than a first threshold, the radio communication apparatus starts the radio communication with the other radio communication apparatus, when the electric reception level is less than a second threshold smaller than the first threshold, the radio communication apparatus determines whether a residual quantity of a secondary battery of the radio communication apparatus is less than a third threshold, and when the residual quantity of the secondary battery is less than the third threshold, the radio communication apparatus stops the radio communication with the other radio communication apparatus, and when the residual quantity of the secondary battery is not less than the third threshold, the radio communication apparatus continues the radio communication with the other radio communication apparatus.

\* \* \* \* \*